United States Patent
Joseph et al.

(10) Patent No.: US 8,140,063 B2
(45) Date of Patent: Mar. 20, 2012

(54) SYSTEM AND METHOD FOR AUTOMATIC UPDATING OF CONTACT INFORMATION

(75) Inventors: Jimmy Joseph, Kerala (IN); Prakash Gupta, Uttar Pradesh (IN); Subeesh Sathyanesan, Kerala (IN)

(73) Assignee: Symbol Technologies, Inc., Holtsville, NY (US)

( * ) Notice: Subject to any disclaimer, the term of this patent is extended or adjusted under 35 U.S.C. 154(b) by 543 days.

(21) Appl. No.: 12/333,506

(22) Filed: Dec. 12, 2008

(65) Prior Publication Data
US 2010/0151844 A1    Jun. 17, 2010

(51) Int. Cl.
*H04M 3/00*    (2006.01)
(52) U.S. Cl. ............ 455/418; 455/414.1; 455/417
(58) Field of Classification Search .......... None
See application file for complete search history.

(56) References Cited

U.S. PATENT DOCUMENTS 5,832,061 A * 11/1998 Rubin ................ 379/88.1
2006/0239434 A1  10/2006 Acharya

* cited by examiner

*Primary Examiner* — Erika Gary

(57) ABSTRACT

A system and method automatically update contact information. The system comprises a recipient device, a dialer communications device, and an update manager. The recipient communications device receives calls forwarded from a service provider. The recipient communications device is reached using updated contact information. The dialer communications device calls the recipient communications device via the service provider using outdated contact information. The update manager transmits the updated contact information to the dialer communications device for an automatic update.

17 Claims, 4 Drawing Sheets

SYSTEM AND METHOD FOR AUTOMATIC UPDATING OF CONTACT INFORMATION

FIELD OF THE INVENTION

The present invention relates generally to a system and method for automatically updating contact information. Specifically, when a recipient of a call has changed his contact number, a caller receives updated contact information relating to the recipient.

BACKGROUND

A mobile unit may provide telephone functionalities to be used. Thus, if a user is in possession of the mobile unit, a caller may reach the user if contact information related to the user is known. However, the contact information may change if, for example, the user changes a service provider, the user retains a new mobile unit that requires new contact information, etc. When the contact information for the user has changed, a caller who only has outdated contact information will be unable to contact the user. Updated contact information may be acquired by potential callers. However, conventional methods of distributing the updated contact information may be inefficient. For example, the user may be required to contact each potential caller to provide the updated contact information.

SUMMARY OF THE INVENTION

The present invention relates to a system and method for an automatic update of contact information. The system comprises a recipient device, a dialer communications device, and an update manager. The recipient communications device receives calls forwarded from a service provider. The recipient communications device is reached using updated contact information. The dialer communications device calls the recipient communications device via the service provider using outdated contact information. The update manager transmits the updated contact information to the dialer communications device for an automatic update.

DETAILED DESCRIPTION

Figure 1:
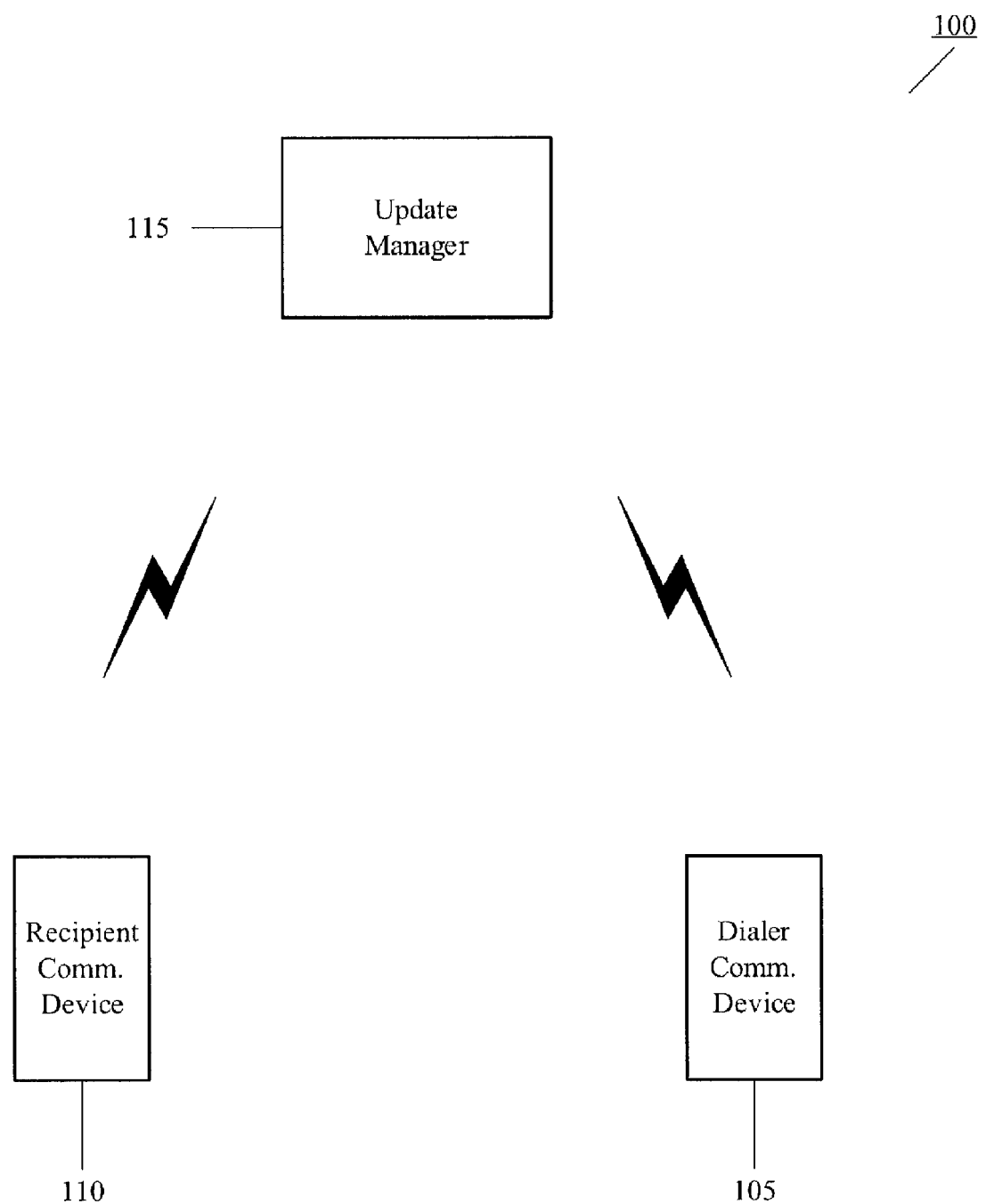
FIG. 1 shows a communications system according to an exemplary embodiment of the present invention.

The exemplary embodiments of the present invention may be further understood with reference to the following description and the appended drawings, wherein like elements are referred to with the same reference numerals. The exemplary embodiments of the present invention describe a system and method for automatically updating contact information. The system may include a first communications device that is configured to connect to a second communications device. The first communications device may be considered a dialer communications device while the second communications device may be considered a recipient communications device. In order for the first communications device to connect to the second communications device, the dialer communications device may be required to have contact information relating to the recipient communications device. The dialer communications device, the recipient communications device, the contact information, and associated methods will be described in further detail below.

FIG. 1 shows a communications system 100 according to an exemplary embodiment of the present invention. The communication system 100 may be a network that is configured to connect a communications device with another communications device. The network may be of any type such as a public switched network (PSTN), a local area network (LAN), a wide area network (WAN), a wireless local area network (WLAN), a virtual private area network (VPAN), a global system for mobile communication (GSM) network, a code division multiple access (CDMA) network, etc. Because the exemplary embodiments of the present invention may apply to a variety of different networks, to simplify components and aspects related to the exemplary embodiments of the present invention, the communications system 100 may include a dialer communications device (DCD) 105, a recipient communications device (RCD) 110, and an update manager 115.

It should be noted that depending on the type of network, the communications system 100 may include additional components. For example, if the communications system 100 is a PSTN, the communications system 100 may include a server, a router, databases, etc. In another example, if the communications system is a WLAN, the communications system 100 may additionally include access points.

The DCD 105 and the RCD 110 may be any computing device that is capable of performing communications functionalities. For example, the DCD 105 and the RCD 110 may be cellular telephones, land line telephones, pagers, mobile units, walkie-talkies, etc. As illustrated, the DCD 105 and the RCD 110 may be mobile units such as cellular telephones. The DCD 105 may be the communications device that transmits signals which attempt to connect to the RCD 110. Accordingly, the RCD 110 may be the communications device that receives the signals which attempt to connect from the DCD 105.

As illustrated, because the DCD 105 and/or the RCD 110 are mobile devices, the signals may be transmitted via transceivers and antennas that are components of the DCD 105 and/or the RCD 110. It should be noted that the signals may be transmitted directly from the DCD 105 to the RCD 110 (e.g., walkie-talkies) or may be transmitted indirectly via network components (e.g., access points, servers, routers, etc.). In another exemplary embodiment, when the DCD 105 and/or the RCD 110 are land line devices, the signals may be transmitted via wires that connect the DCD 105 to the RCD 110. It should be noted that the wires may pass through intermediate devices of the network such as a server, a router, etc.

The update manager 115 may be an intermediate component that is utilized when the contact information of the RCD 110 has changed and the outdated contact information stored on the DCD 105 requires updating. The update manager 115 may be an intermediate component that may be a stand alone device, an attachment to other devices, an integrated component of another device, a program installed on another device, etc. Thus, the update manager 115 may be in a variety of locations.

In a first example, if the communications system 100 is a WLAN, the update manager 115 may be a program installed on an access point. Contact information related to mobile units associated with the communications system 100 may be stored on a database of a server. The server may forward any contact information to the access point. In a second example, if the communications system 100 is a PSTN, the update manager 115 may be an integrated component of a router. The router may include a database that stores contact information related to the RCD 110. The router may retrieve the contact information and be provided to the update manager 115.

According to a first exemplary embodiment of the present invention, the update manager 115 may be a functionality of a service provider for the RCD 110. A user of the RCD 110 may register with the service provider so that the update manager 115 may provide updated contact information to a user of the DCD 105 who is only aware of outdated contact information relating to the user of the RCD 110. The update manager 115 may also provide an auto response. For example, the auto response may convey that the contact information used to reach the party is outdated (e.g., the number no longer exists). Because all calls with a destination of the RCD 110 (via the updated contact information or the outdated contact information) are routed through the service provider and, thus, the update manager 115, each DCD 105 that attempts to contact the user of the RCD 110 with the outdated contact information may automatically receive the updated contact information.

In the first exemplary embodiment of the present invention, the updated contact information may be provided by the update manager 115 using voice tones and/or pulses. Specifically, the service provider may set a ring tone for the RCD 110 to embed the updated contact information. Thus, when the DCD 105 attempts to call the RCD 110 using the outdated contact information, the ring tone gets played during a ringing phase so that the voice tones and/or pulses may be sent to a dialer application of the DCD 105. The dialer application may decode the voice tones and/or pulses to receive the updated contact information. The dialer application may also automatically update the contact information relating to the RCD 110 in a memory of the DCD 105. Therefore, after a first attempt at the DCD 105 calling the RCD 110, the DCD 105 may perform a further attempt at calling the RCD 110 using the updated contact information. The update manager 115 may also be configured to perform an automatic termination of the call upon the voice tones and/or pulses being transmitted. This may enable an automatic redial with the updated contact information.

According to a second exemplary embodiment of the present invention, the update manager 115 may configure a voice message. An incoming call made using outdated contact information may be forwarded to the voice message. The voice message may include a personal message from the user of the RCD 110 informing the user of the DCD 105 that the contact information has changed. The voice message may also be configured to include voice tones and/or pulses with data relating to the updated contact information embedded therein. Thus, when the voice message is played, the voice tones and/or pulses may be received by the dialer application of the DCD 105. Because all calls dialed with the outdated contact information are routed to the voice message and, thus, the update manager 115, each DCD 105 that attempts to contact the user of the RCD 110 with the outdated contact information may automatically receive the updated contact information.

Similar to the first exemplary embodiment, in the second exemplary embodiment of the present invention, the updated contact information may be provided by the update manager 115 (voice message) using voice tones and/or pulses. Specifically, the voice message may indicate to the user of the DCD 105 that the contact information is different and the voice message may send the voice tones and/or pulses to the dialer application of the DCD 105 to be decoded. The dialer application may decode the voice tones and/or pulses to receive the updated contact information. The dialer application may also automatically update the contact information relating to the RCD 110 in a memory of the DCD 105. Therefore, after a first attempt at the DCD 105 calling the RCD 110, the DCD 105 may perform a further attempt at calling the RCD 110 using the updated contact information.

According to a third exemplary embodiment of the present invention, the update manager 115 may be part of the service provider of the RCD 110. Specifically, the user of the RCD 110 may register with the service provider to forward calls made to the outdated contact information to the update contact information. Thus, when the DCD 105 attempts to call the RCD 110 using the outdated contact information, the DCD 105 attempts to call the RCD 110 via the updated contact information. The service provider may also configure the ring tone for the RCD 110 to be embedded with the updated contact information. Accordingly, voice tones and/or pulses may be sent to the DCD 105. Because all calls dialed with the outdated contact information are routed to the RCD 110 and, thus, the ring tone embedded with the voice tones and/or pulses are received by the DCD 105, each DCD 105 that attempts to contact the user of the RCD 110 with the outdated contact information may automatically receive the updated contact information.

In the third exemplary embodiment of the present invention, the updated contact information may be provided by the update manager 115 using voice tones and/or pulses. Specifically, the ring tone may be encoded with the voice tones and/or pulses and be sent to the dialer application of the DCD 105 to be decoded. The dialer application may decode the voice tones and/or pulses to receive the updated contact information. The dialer application may also automatically update the contact information relating to the RCD 110 in a memory of the DCD 105. Therefore, after a first attempt at the DCD 105 calling the RCD 110, the DCD 105 may perform a further attempt at calling the RCD 110 using the updated contact information.

Figure 2:
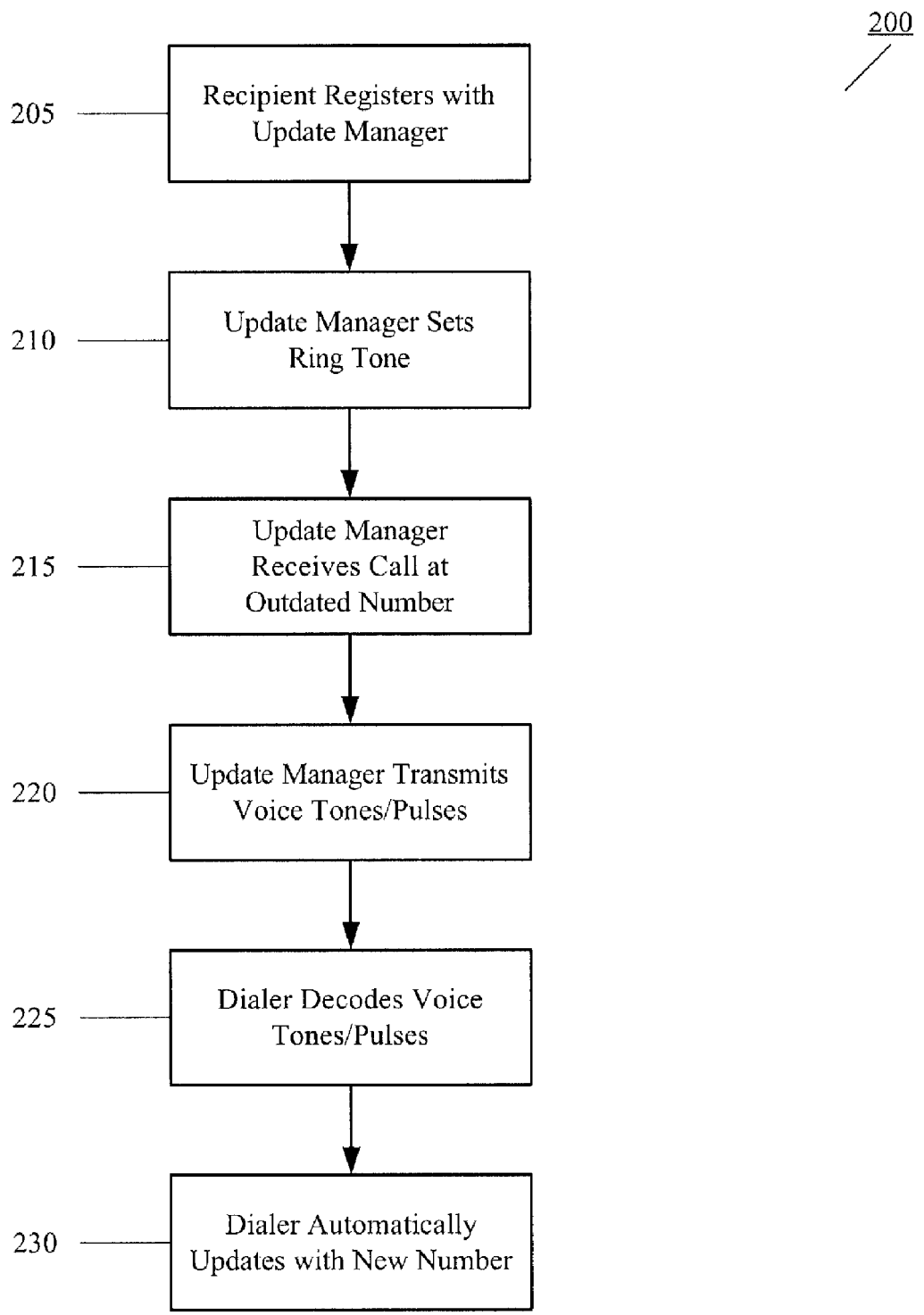
FIG. 2 shows a first method for updating contact information according to an exemplary embodiment of the present invention.

FIG. 2 shows a first method 200 for updating contact information according to an exemplary embodiment of the present invention. The first method 200 may relate to the first exemplary embodiment of the present invention described above. The first method 200 will be described with reference to the communications system 100 of FIG. 1.

In step 205, the user of the RCD 110 registers with the update manager 115 of the service provider. The registration with the service provider instructs the service provider to enable a setting of the ring tone or may provide an auto-response (e.g., convey that the number no longer exists). Thus, in step 210, the update manager 115 sets the ring tone or auto response for the outdated contact information to be embedded with voice tones and/or pulses relating to data of the updated contact information.

In step 215, the update manager 115 receives a call from the DCD 105 using the outdated contact information. When the call is received, because the ring tone or auto-response is encoded with the updated contact information, in step 220, the update manager 115 transmits the voice tones and/or pulses to the DCD 105. In step 225, the DCD 105 receives the voice tones and/or pulses. Specifically, the dialer application receives the voice tones and/or pulses which are embedded in the ring tone or auto-response. In step 230, the dialer application of the DCD 105 may automatically update the contact information from the outdated one to the updated one which was decoded from the voice tones and/or pulses.

Figure 3:
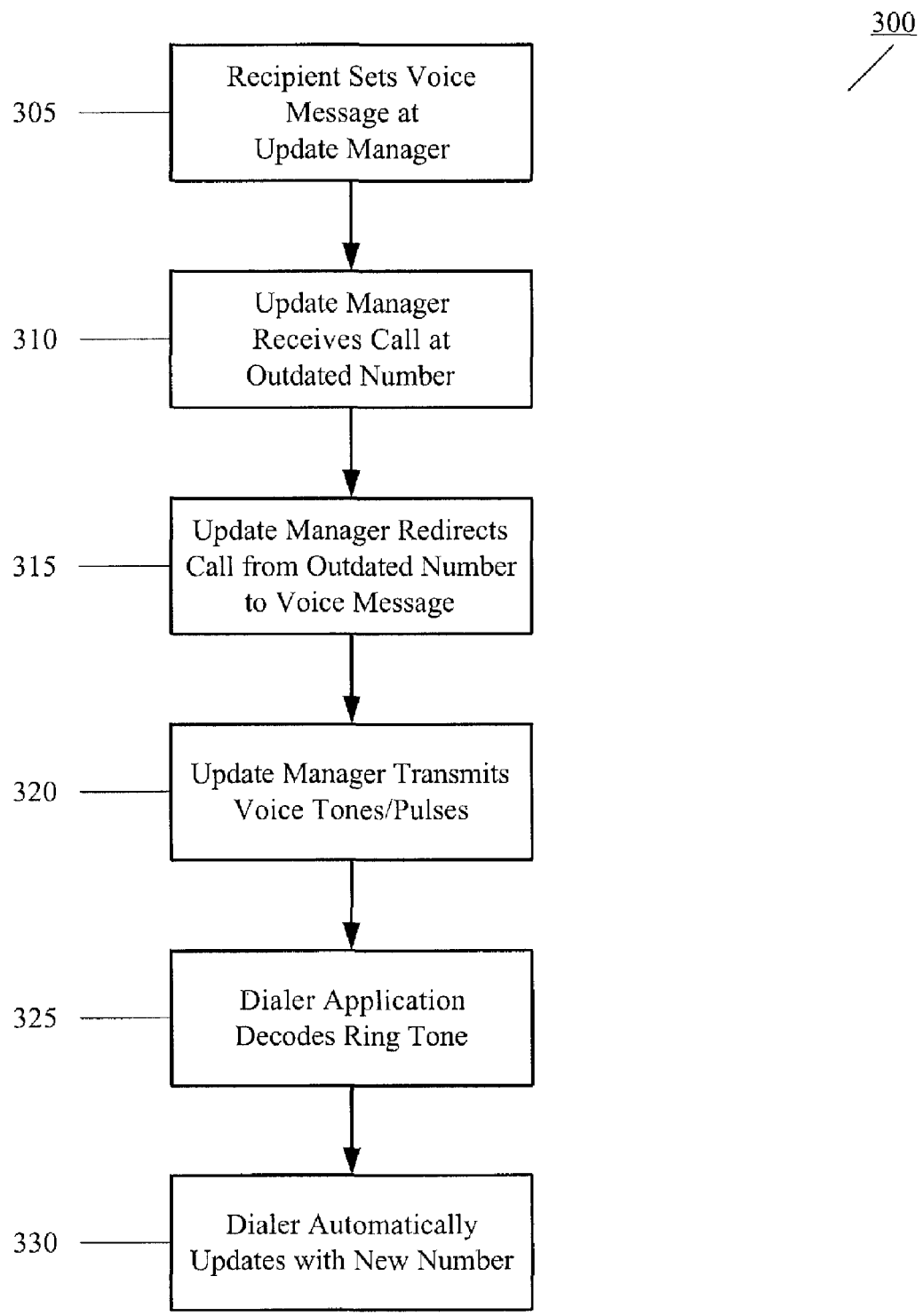
FIG. 3 shows a second method for updating contact information according to an exemplary embodiment of the present invention.

FIG. 3 shows a second method 300 for updating contact information according to an exemplary embodiment of the present invention. The second method 300 may relate to the second exemplary embodiment of the present invention described above. The second method 300 will be described with reference to the communications system 100 of FIG. 1.

In step 305, the user of the RCD 110 sets a voice message at the update manager. The voice message may be stored with the service provider that receives all incoming calls bound for the RCD 110 or to the outdated contact information. In step 310, the update manager 115 may receive a call from the DCD 105 using the outdated contact information. In step 315, the incoming call may be redirected by the update manager 115 to the voice message that was set in step 305. The voice message may be played for the DCD 105 indicating that the contact information has changed. As discussed above, the voice message may include a personal message from the user of the RCD 110 and may also include the voice tones and/or pulses with the updated contact information embedded therein.

In step 320, the update manager 115 transmits the voice tones and/or pulses to the DCD 105 via the voice message. In step 325, the DCD 105 receives the voice tones and/or pulses. Specifically, the dialer application receives the voice tones and/or pulses which are embedded in the voice message. Subsequently, the dialer application decodes the voice tones and/or pulses. In step 330, the dialer application of the DCD 105 may automatically update the contact information from the outdated one to the updated one which was decoded from the voice tones and/or pulses.

Figure 4:
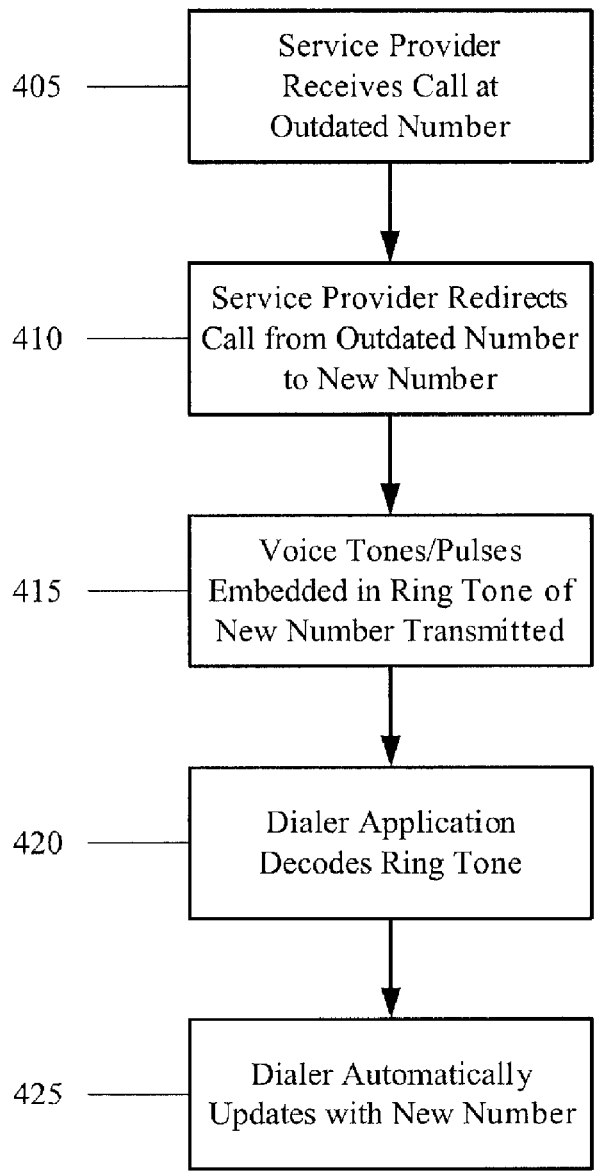
FIG. 4 shows a third method for updating contact information according to an exemplary embodiment of the present invention.

FIG. 4 shows a third method 400 for updating contact information according to an exemplary embodiment of the present invention. The third method 400 may relate to the third exemplary embodiment of the present invention described above. The third method 400 will be described with reference to the communications system 100 of FIG. 1.

In step 405, the update manager 115 may receive a call from the DCD 105 using the outdated contact information. The user of the RCD 110 may have registered with the service provider to have all calls made to the outdated contact information to be redirected to the updated contact information. Thus, in step 410, the service provider may redirect the call that was received in step 405 to the updated contact information.

In step 415, the update manager of the RCD 110 may have set the ring tone for the updated contact information so that voice tones and/or pulses are transmitted to the DCD 105. Specifically, the ring tone for the updated contact information may be embedded with the voice tones and/or pulses. Thus, in step 420, the dialer application of the DCD 105 may decode the voice tones and/or pulses to extract the updated contact information. In step 330, the dialer application of the DCD 105 may automatically update the contact information from the outdated one to the updated one which was decoded from the voice tones and/or pulses.

The exemplary embodiments of the present invention enable an automatic updating of contact information for a dialer communications device when attempting to reach a recipient communications device using outdated contact information. The contact information may be updated so that on a first or second attempt by the dialer communications device to call the recipient communications device, the updated contact information will be used, thereby enabling a call to be reached to the recipient communications device.

According to the first exemplary embodiment of the present invention, the updating of the contact information may be performed by the update manager which is part of the service provider of the recipient communications device. Thus, when a call is received from the dialer communications device using the outdated contact information, a ring tone which is embedded with voice tones and/or pulses may be transmitted to a dialer application of the dialer communications device. The contact information relating to the user of the recipient communications device may automatically be updated on the dialer communications device. Therefore, when the dialer communications device attempts to call the recipient communications device, the proper contact information will be used.

According to the second exemplary embodiment of the present invention, the updating of the contact information may be performed by using a voice message which is configured by the update manager. The voice message may be stored by the service provider of the recipient communications device. Thus, when a call is received from the dialer communications device using the outdated contact information, the call is forwarded to the voice message which is embedded with voice tones and/or pulses that may be transmitted to a dialer application of the dialer communications device. The contact information relating to the user of the recipient communications device may automatically be updated on the dialer communications device. Therefore, when the dialer communications device attempts to call the recipient communications device, the proper contact information will be used.

According to the third exemplary embodiment of the present invention, the updating of the contact information may be performed by the update manager which configures a ring tone for the updated contact information. The user of the recipient communications device may register with the service provider to have all calls made with the outdated contact information to be forwarded using the updated contact information. Thus, when a call is received from the dialer communications device using the outdated contact information, the call is forwarded to the recipient communications device which has a ring tone that is embedded with voice tones and/or pulses. The voice tones and/or pulses may be transmitted to a dialer application of the dialer communications device. The contact information relating to the user of the recipient communications device may automatically be updated on the dialer communications device. Therefore, the initial attempt by the dialer communications device to call the recipient communications device may be successful so that the two devices connect and the contact information may be updated concurrently.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
    a recipient communications device receiving calls forwarded from a service provider comprising an update manager, the recipient communications device being reached using updated contact information; and
    a dialer communications device calling the recipient communications device via the service provider using outdated contact information;
    wherein the update manager transmits the updated contact information to the dialer communications device for an automatic update and sets a ring tone for the outdated contact information to be embedded with at least one of voice tones and pulses that include the updated contact information.

2. The system of claim 1, wherein the dialer communications device includes a dialer application that decodes the at least one of voice tones and pulses to extract the updated contact information.

3. The system of claim 1, wherein the service provider forwards the call from the dialer communications device to a preset voice message.

4. The system of claim 3, wherein the voice message is embedded with at least one of voice tones and pulses that include the updated contact information.

5. The system of claim 4, wherein the dialer communications device includes a dialer application that decodes the at least one of voice tones and pulses to extract the updated contact information.

6. The system of claim 1, wherein the recipient communications device receives the call from the dialer communications device from the service provider forwarding the call from the dialer communications device using the outdated contact information to the updated contact information.

7. The system of claim 6, wherein the update manager sets a ring tone for the calls forwarded from the service provider to be embedded with at least one of voice tones and pulses that include the updated contact information.

8. The system of claim 7, wherein the dialer communications device that includes a dialer application decodes the at least one of voice tones and pulses to extract the updated contact information.

9. A method, comprising:
calling, from a dialer communications device to a recipient communications device, using outdated contact information for the recipient communications device;
transmitting, from an update manager to the dialer communication device, updated contact information for the recipient communications device;
automatically updating the outdated contact information with the updated contact information; and
setting a ring tone for the outdated contact information to be embedded with at least one of voice tones and pulses that include the updated contact information.

10. The method of claim 9, further comprising:
receiving the at least one of voice tones and pulses at the dialer communications device;
decoding the at least one of voice tones and pulses using a dialer application of the dialer communications device; and
extracting the updated contact information.

11. The method of claim 9, further comprising:
forwarding the call from the dialer communications device to a preset voice message.

12. The method of claim 11, wherein the voice message is embedded with at least one of voice tones and pulses that include the updated contact information.

13. The method of claim 12, further comprising:
receiving the at least one of voice tones and pulses at the dialer communications device;
decoding the at least one of voice tones and pulses using a dialer application of the dialer communications device; and
extracting the updated contact information.

14. The method of claim 9, further comprising:
forwarding the call made using the outdated contact information to the recipient communications device.

15. The method of claim 14, further comprising:
setting a ring tone for the recipient communications device to be embedded with at least one of voice tones and pulses that include the updated contact information.

16. The method of claim 15, further comprising:
receiving the at least one of voice tones and pulses at the dialer communications device;
decoding the at least one of voice tones and pulses using a dialer application of the dialer communications device; and
extracting the updated contact information.

17. A system, comprising:
a first communications means for receiving calls forwarded from a service provider comprising an update means, the first communications means being reached using updated contact information; and
a second communications means calling the first communications means via the service provider using outdated contact information;
wherein the updating means transmits the updated contact information to the dialer communications device for an automatic update and sets a ring tone for the outdated contact information to be embedded with at least one of voice tones and pulses that include the updated contact information.

* * * * *

UNITED STATES PATENT AND TRADEMARK OFFICE
CERTIFICATE OF CORRECTION

PATENT NO. : 8,140,063 B2  
APPLICATION NO. : 12/333506  
DATED : March 20, 2012  
INVENTOR(S) : Joseph et al.

Page 1 of 1

It is certified that error appears in the above-identified patent and that said Letters Patent is hereby corrected as shown below:

In the Specifications:

In Column 1, Line 43, delete "DESCRIPTION" and insert -- BRIEF DESCRIPTION --, therefor.

In Column 2, Lines 14-15, delete "public switched network" and insert -- public switched telephone network --, therefor.

Signed and Sealed this
Sixteenth Day of April, 2013

Teresa Stanek Rea
*Acting Director of the United States Patent and Trademark Office*